(12) United States Patent
Rane et al.

(10) Patent No.: US 8,375,030 B2
(45) Date of Patent: Feb. 12, 2013

(54) DIFFERENTIALLY PRIVATE AGGREGATE CLASSIFIER FOR MULTIPLE DATABASES

(75) Inventors: Shantanu Rane, Caambridge, MA (US); Manas A. Pathak, Pittsburgh, PA (US); Bhiksha Ramakrishnan, Pittsburgh, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 18 days.

(21) Appl. No.: 12/960,221

(22) Filed: Dec. 3, 2010

(65) Prior Publication Data

US 2012/0143922 A1    Jun. 7, 2012

(51) Int. Cl.
*G06F 17/30* (2006.01)
(52) U.S. Cl. ............................ 707/736; 706/45; 706/49
(58) Field of Classification Search .................. None
See application file for complete search history.

(56) References Cited

PUBLICATIONS

Jagannathan et al., "A Pratical Differentially Private Random Decision Tree Classifier", Dec. 6, 2009, IEEE, pp. 114-121.*

* cited by examiner

*Primary Examiner* — Hung Q Pham
(74) *Attorney, Agent, or Firm* — Dirk Brinkman; Gene Vinokur (57) ABSTRACT

Embodiments of the invention disclose a system and a method for determining a differentially private aggregate classifier for a set of databases, wherein each database in the set of databases is associated with a classifier and a noise value, wherein the classifier and the noise value are determined locally for each database, such that a combination of the classifier and the noise value ensure a differential data privacy of the database, and wherein the differentially private aggregate classifier preserves the differential data privacy of each database. The differentially private aggregate classifier is a combination of the classifiers of the set of databases modified with the noise value corresponding to a smallest database in the set of databases.

12 Claims, 5 Drawing Sheets

DIFFERENTIALLY PRIVATE AGGREGATE CLASSIFIER FOR MULTIPLE DATABASES

FIELD OF THE INVENTION

The invention relates generally to differential data privacy, and more particularly to determining a differentially private aggregate classifier for multiple databases.

BACKGROUND OF THE INVENTION

Data collection provides information for a wide variety of academic, industrial, business, and government purposes. For example, data collection is necessary for sociological studies, market research, and in a census. To maximize the utility of collected data, all data can be amassed and made available for analysis without any privacy controls. Of course, most people and organizations ("privacy principals") are unwilling to disclose all data, especially when data are easily exchanged and could be accessed by unauthorized persons. Privacy guarantees can improve the willingness of privacy principals to contribute their data, as well as to reduce fraud, identity theft, extortion, and other problems that can arise from sharing data without adequate privacy protection.

A method for preserving privacy is to compute collective results of queries performed over collected data, and disclose such collective results without disclosing the inputs of the participating privacy principals. For example, a medical database might be queried to determine how many people in the database are HIV positive. The total number of people that are HIV positive can be disclosed without disclosing the names of the individuals that are HIV positive. Useful data are thus extracted while ostensibly preserving the privacy of the principals to some extent.

However, adversaries might apply a variety of techniques to predict or narrow down the set of individuals from the medical database who are likely to be HIV positive. For example, an adversary might run another query that asks how many people both have HIV and are not named John Smith. The adversary may then subtract the second query output from the first, and thereby learn the HIV status of John Smith without ever directly asking the database for a name of a privacy principal. With sensitive data, it is useful to provide verifiable privacy guarantees. For example, it would be useful to verifiably guarantee that nothing more can be gleaned about any specific privacy principal than was known at the outset.

Adding noise to a query output can enhance the privacy of the principals. Using the example above, some random number might be added to the disclosed number of HIV positive principals. The noise will decrease the accuracy of the disclosed output, but the corresponding gain in privacy may warrant this loss.

The concept of adding noise to a query result to preserve the privacy of the principals is generally known. One method uses differentially private classifiers for protecting the privacy of individual data instances using added noise. A classifier evaluated over a database is said to satisfy differential privacy if the probability of the classifier producing a particular output is almost the same regardless of the presence or absence of any individual data instance in the database.

However, the conventional differentially private classifiers are determined locally for each database and fail to provide privacy when there is a requirement to use those classifiers over multiple databases. Accordingly, there is a need to determine such a classifier for a set of databases that preserves the differential data privacy of each database.

SUMMARY OF THE INVENTION

Differential privacy provides statistical guarantees that the output of a classifier does not include information about individual data instances. However, in multiparty applications, data for determining a classifier are distributed across several databases, and conventional differential privacy methods do not preserve differential data privacy for multiple contributing parties.

This is because conventional methods are inherently designed for the case where the classifier is determined based on access to the entire data of the database and is modified by the noise value computed over the data to produce differentially private classifier specifically for that data. However, in multiparty applications, it is often impossible to access the data of different database due to security constraints.

Embodiments of the invention are based on a realization that for a set of databases, a differentially private aggregate classifier preserving the differential data privacy of each database can be determined from the classifiers and the noise values of individual databases in the set of databases, without allowing access to the data of the databases.

However, in multiparty applications, adding the noise value to the classifier is no longer straightforward. This is because there is no guarantee that the added noise results in the differential data privacy of each database. For example, the aggregation of all classifiers and the noise values, which would be considered as a logical approach, does not satisfy differential privacy for the combined data.

Embodiments of the invention are based on another realization that a differentially private aggregate classifier can be determined as an aggregation of classifiers of each database modified by a noise value corresponding to a smallest database in the set of databases. The smallest database has the smallest number of entries, wherein a data structure of each entry is the same across all databases. The proof for correctness of this realization is provided in the Appendix.

Accordingly, one embodiment of the invention discloses a method for determining a differentially private aggregate classifier for a set of databases, wherein each database in the set of databases is associated with a classifier and a noise value, wherein the classifier and the noise value are determined locally for each database, such that a combination of the classifier and the noise value ensure differential data privacy of the database, and wherein the differentially private aggregate classifier preserves the differential data privacy of each database, comprising the steps of: combining classifiers of each database to determine an aggregate classifier; and modifying the aggregate classifier with a noise value corresponding to a smallest database, wherein the smallest database has the smallest number of entries, wherein a data structure of each entry is the same for all databases.

Moreover, various embodiments of the invention determine the differentially private aggregate classifier securely using cryptographic protocols. Those embodiments ensure that the data of each database are not shared with any other party and the differentially private aggregate classifier cannot be reverse engineered to learn about any individual data instances of any database.

Another embodiment discloses a system for determining a differentially private aggregate classifier for a set of databases, wherein each database in the set of databases is associated with a classifier and a noise value, wherein the classifier and the noise value are determined locally for each database, such that a combination of the classifier and the noise value ensure a differential data privacy of the database, and wherein the differentially private aggregate classifier preserves the differential data privacy of each database, comprising: means for combining classifiers to determine an aggregate classifier; and means for modifying the aggregate classifier with a noise value corresponding to a smallest database in the set of databases to produce the differentially private aggregate classifier.

Yet another embodiment discloses a computer readable medium storing a differentially private aggregate classifier for a set of databases, wherein each database in the set of databases is associated with a classifier and a noise value, wherein the classifier and the noise value are determined locally for each database, such that a combination of the classifier and the noise value ensure a differential data privacy of the database, wherein the differentially private aggregate classifier is a combination of the classifiers of the set of databases modified with the noise value corresponding to a smallest database in the set of databases.

Definitions

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

DETAILED DESCRIPTION OF THE PREFERRED EMBODIMENT

Figure 1:
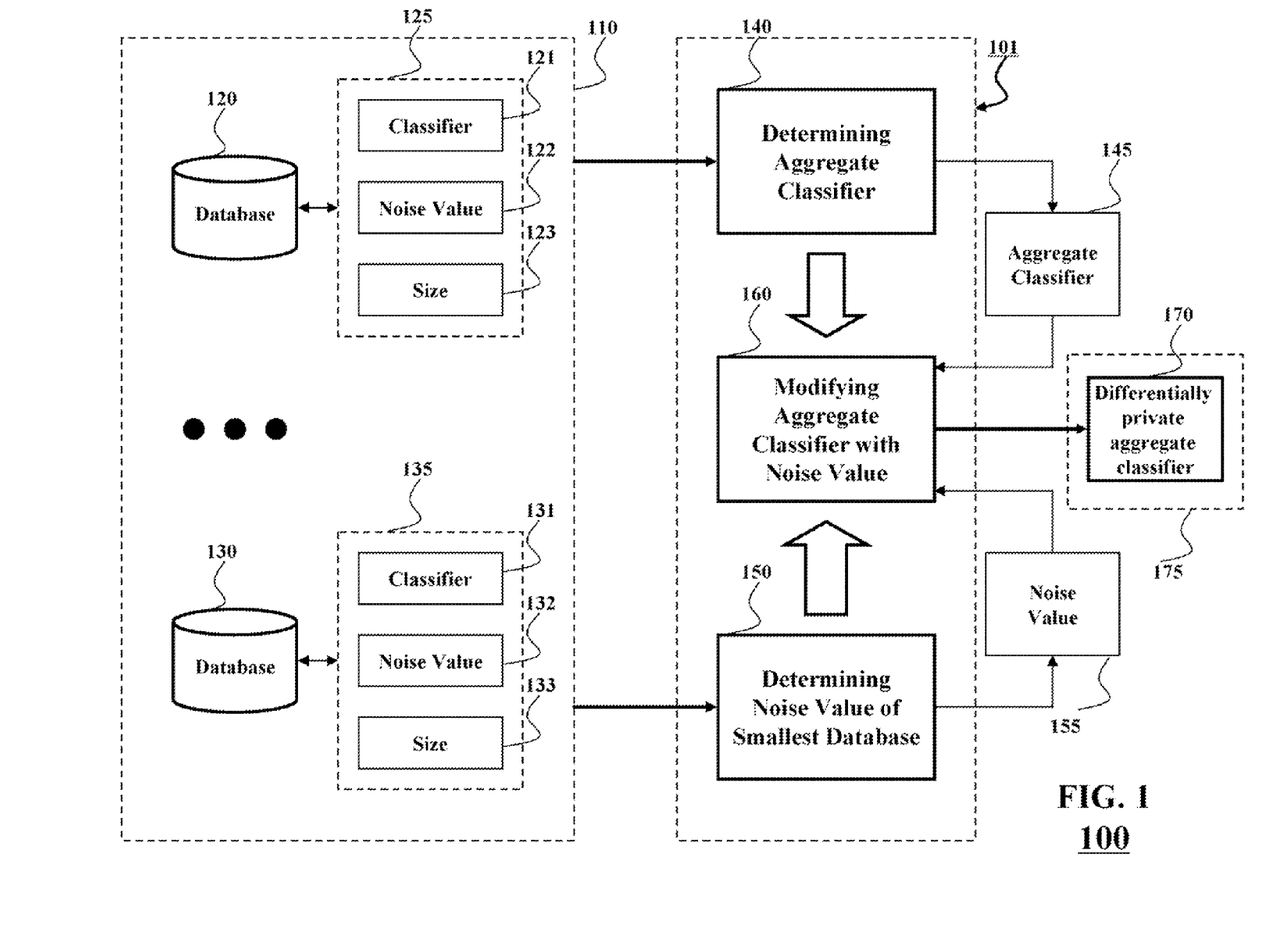
FIG. 1 is a block diagram of a method for determining a differentially private aggregate classifier according to embodiments of invention.

As shown in FIG. 1, embodiments of the invention disclose a system and a method 100 for determining a differentially private aggregate classifier 170 for a set of databases 110, such that the differentially private aggregate classifier preserves differential data privacy of each database in the set. The embodiments of the invention can be implemented by a processor 101 including memory and input/output interfaces as known in the art.

Each database 120-130 in the set of databases 110 is associated with a classifier, e.g., the classifiers 121 and 131 and a noise value, e.g., noise values 122 and 132. For example, the databases are denoted as $D_1, \ldots, D_K$, where $D_j=(x,y)|_j$ includes a set of entries x and corresponding binary labels y. The classifier and the noise value are determined locally for each database, such that a combination of the classifier and the noise value ensure a differential data privacy 125 or 135 of the database. The determined locally means that the classifiers and the noise values are determined independently by each owner of the database before or concurrently with the execution of the method 100.

Typically, to ensure the differential privacy, the noise value is determined over the entire data entries of the database in dependence with a size 123 or 133 of the database. As used herein, the size of the database is based on a number of entries. The entry can have any data structure. However the data structure of each entry is the same across all databases. Examples of the entry are a field, a row in a table, a table itself, a file, or another database.

Embodiments of the invention are based on a realization that a differentially private aggregate classifier from the union of the databases $D_1 \cup D_2 \ldots \cup D_K$ can be determined as an aggregation of classifiers of each database modified by a noise value corresponding to the smallest database in the set of databases. The smallest database has the smallest number of entries, wherein a data structure of each entry is the same for all databases. The proof for correctness of this realization is provided in the Appendix A.

Accordingly, one embodiment combines 140 classifiers of each database to determine an aggregate classifier 145. Additionally, the embodiments determines 150 the noise value 155 corresponding to the smallest database. Next, the aggregate classifier 145 is modified 160 with the noise value 155 to produce the differentially private aggregate classifier 170. The differentially private aggregate classifier is published, e.g., stored in a memory 175 or distributed over internet.

Differential Privacy

According to the definition of a differential privacy model, given any two databases D and D' differing by one element, i.e., adjacent databases, a classifier defined by a randomized query function M is differentially private, if the probability that the function M produces a response S on the database D is similar to the probability that the function M produces the same response S on the database D'. As the query output is almost the same in the presence or absence of an individual entry with high probability, almost nothing can be learned about any individual entry from the output.

The randomized function M with a well-defined probability density P satisfies ε-differential privacy if, for all adjacent databases D and D' and for any S∈range(M), $$\left| \log \frac{P(M(D) = S)}{P(M(D') = S)} \right| \leq \varepsilon. \quad (1)$$

Accordingly, the differentially private classifier guaranties that no additional details about the individual entries can be obtained with certainty from output of the learning algorithm, beyond the a priori background knowledge. Differential privacy provides an ad omnia guarantee as opposed to most other models that provide ad hoc guarantees against a specific set of attacks and adversarial behaviors. By evaluating the differentially private classifier over a large number of entries, an adversary cannot learn the exact form of the data.

Figure 2A:
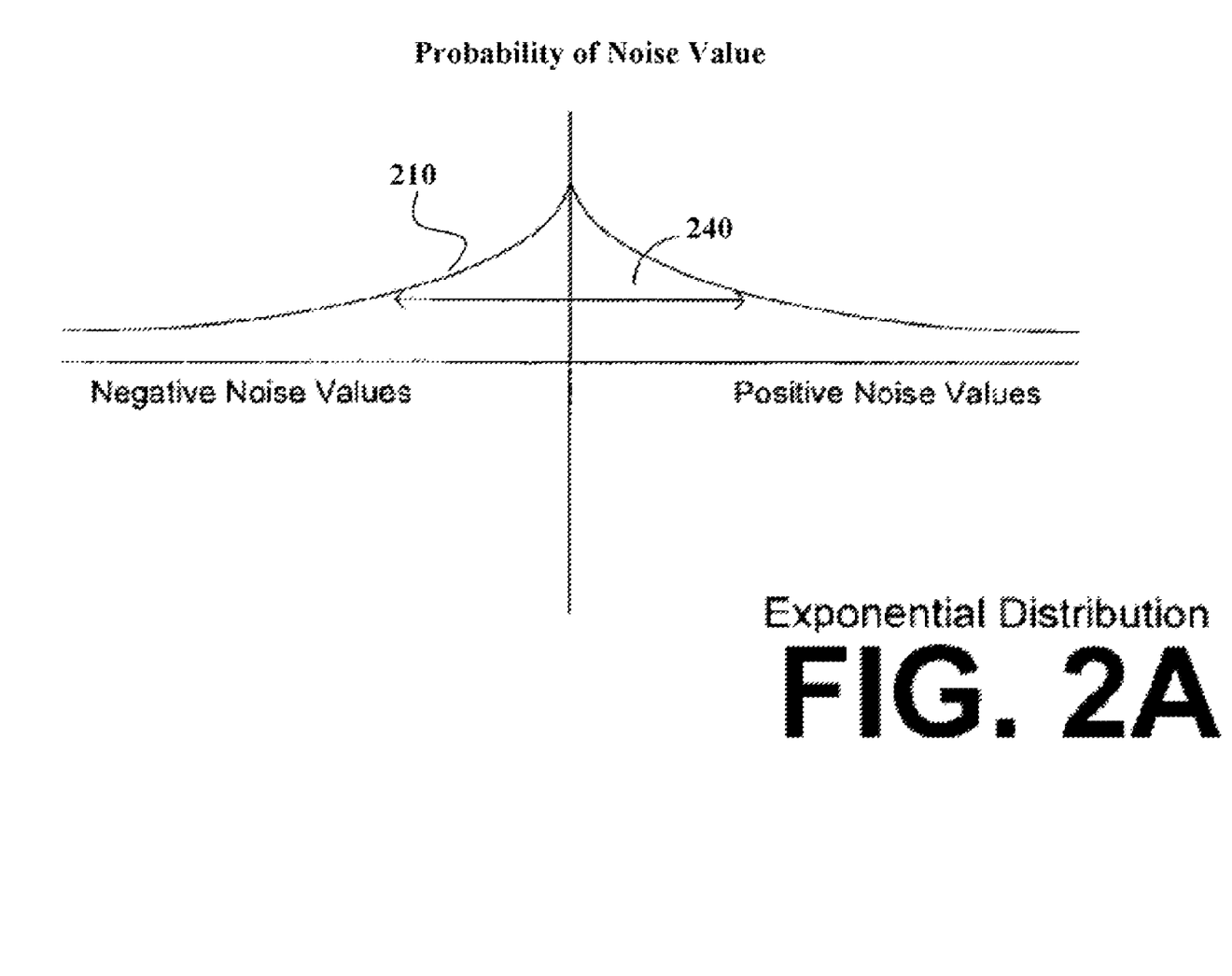
FIG. 2A is a graph of an exponential distribution of possible noise values.
Figure 2B:
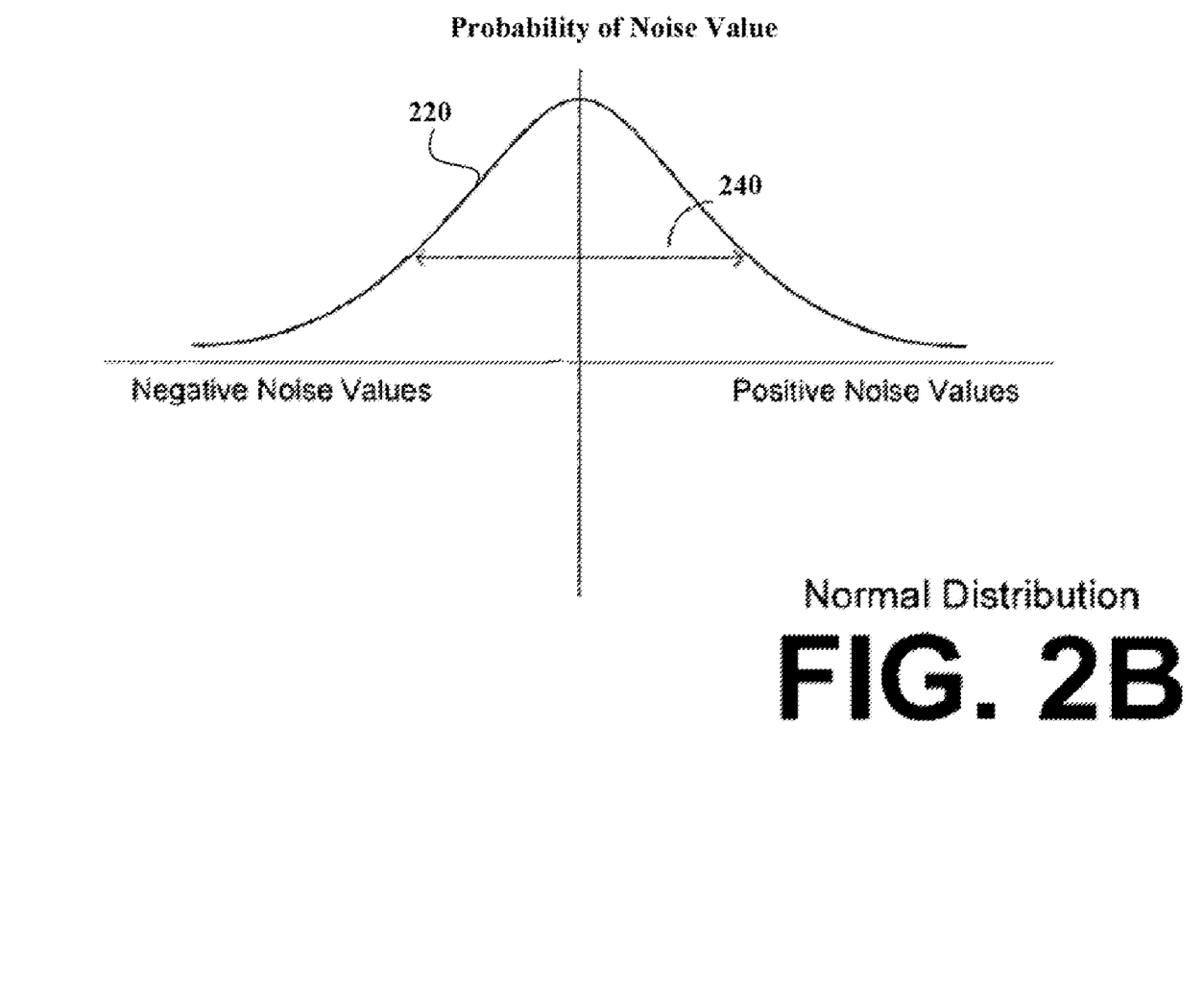
FIG. 2B is a graph of a normal distribution of possible noise values.
Figure 2C:
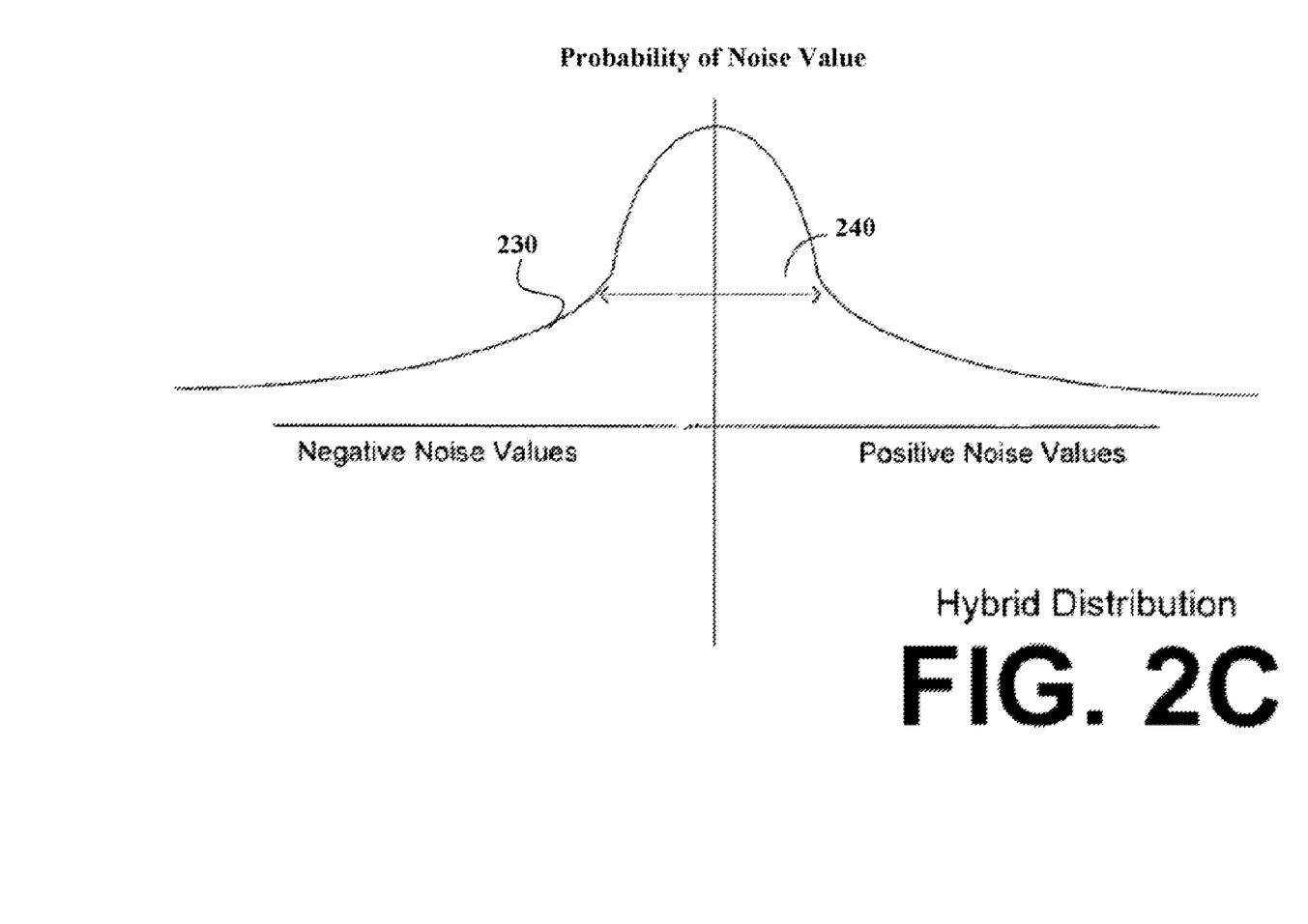
FIG. 2C is a graph of a hybrid distribution of possible noise values.

FIGS. 2A-2C show noise values along a horizontal axis, and probabilities associated with such noise values on the vertical axis. Thus, a noise value with high probability is more likely of being selected. The distributions all share a beneficial feature of decreasing the probability of a given noise value as the absolute value increases. This allows noisy outputs to be useful, because the probability of an excessively high noise value is unlikely.

FIG. 2A shows an exponential distribution 210 of the noise values. FIG. 2B shows a normal distribution 220 of the noise values. FIG. 2C shows a hybrid distribution 230 of the noise values. The hybrid distribution of FIG. 2C is a normal and exponential distribution, such that a normal distribution defines a portion of the distribution comprising the most probable noise values, i.e., those with a higher probabilities, and an exponential distribution defines a portion of the distribution comprising the least probable noise values, i.e., those with low probabilities, corresponding to larger absolute noise values.

A differential diameter 240 and privacy parameter ε can be used in calculating each of the distributions in FIGS. 2A-2C. A large differential diameter value widens the distribution, increasing the probability that a larger noise values is used. Conversely, a small differential diameter decreases the likelihood of large noise values. When the privacy parameter is in the denominator of the distribution function, a small value of the privacy parameter ε corresponds to strong privacy and vice versa. The exemplary equations described above are satisfactory, and can be used to construct an infinite variety of distributions that successfully utilize a differential diameter measurement and privacy parameter to create a satisfactory noise distribution. For example, an infinite number of small modifications to the distributions depicted in FIGS. 2A-2C are possible.

Typically, the classifiers are designed to be differentially private by adding a noise value to the weights of the classifier, where the noise value is selected from the distribution described above. Further, parameters of the distribution depend on a degree of desired privacy expressed by the epsilons ε, which usually depends on the size of the database, and on the type of the function of the classifier, e.g., average, or maximum or logarithm function. In one embodiment, the noise values have a Laplace distribution.

Determining Classifiers Locally on Individual Databases

Each database owner $P_j$ uses its database $(x, y)|_j$ to determine the classifier with weights $w_j$, wherein j is an index of the database. One embodiment uses a regularized logistic regression function $l_2$ for the classifiers. For example, the classifier $w_j$ can be determined by minimizing the following objective function $$w_j = \operatorname*{argmin}_w J(w) = \operatorname*{argmin}_w \frac{1}{n_j} \sum_i \log\!\left(1 + e^{-y_i w^T x_i}\right) + \lambda w^T w, \quad (2)$$

where λ>0 is a regularization parameter, and T is a transpose operator. However, the classifiers are determined Focally for each individual database and no data or information are shared.

Example of Differentially Private Aggregate Classifier

One embodiment of the invention defines the differentially private aggregate classifier $w^s$ 170 according to $$w^s = \frac{1}{K} \sum_j w_j + \eta,$$

where K is a number of the databases in the set of databases, j is the index of the database, and η is a d-dimensional random variable sampled from a Laplace (Lap) distribution scaled with a parameter $$\frac{2}{n_{(1)}\varepsilon\lambda},$$

$n_{(1)}$ is the noise value corresponding to the smallest database, i.e., $n_{(1)} = \min_j n_j$, λ is the parameter of the Laplace distribution, and ε is the differential privacy parameter.

The differentially private aggregate classifier $w^s$ incurs only a well-bounded excess risk over training a classifier directly on the union of all data while enabling the parties to maintain their privacy. The noise value η ensures that the classifier $w^s$ satisfies differential privacy, i.e., that individual data instances cannot be discerned from the classifier.

The definition of the noise value η above is not intuitive, but we have proved that differentially private aggregate classifier constructed by aggregating locally trained classifiers is limited by the performance of the individual classifier that has the least number of entries.

Some embodiments of the invention are based on the realization that the owners of the databases $P_j$ cannot simply take their locally trained classifiers $w_j$, perturb them with a noise vector and publish the perturbed classifiers, because aggregating such classifiers will not give the correct noise value η: $\operatorname{Lap}(2/(n_{(1)}\varepsilon\lambda))$ that ensures differential privacy. Also, because individual database owners cannot simply add noise to their classifiers to impose differential privacy for all other classifiers, the actual averaging operation must be performed such that the individual classifiers or the number of entries in each database are not exposed. Accordingly, some embodiments use a secure multiparty computation (SMC) method for interacting with a processor to perform the averaging. The outcome of the method is such that each of the database owners obtains additive shares of the desired differentially private classifier $w^s$, such that these shares must be added to obtain the differentially private aggregate classifier.

Secure Multiparty Computation (SMC) Method

The embodiments use asymmetric key additively homomorphic encryption. A desirable property of such encryption is that operations performed on ciphertext elements maps into known operations on the same plaintext elements. For an additively homomorphic encryption function $\xi(\bullet)$, that means that for any a and b $\xi(a)\xi(b)=\xi(a+b)$, $\xi(a)^b=\xi(ab)$.

The additively homomorphic encryption is semantically secure, i.e., repeated encryption of the same plaintext will result in different cyphertexts. For the SMC method, encryption keys are considered public and decryption keys are privately owned by the specified database owners.

Figure 3:
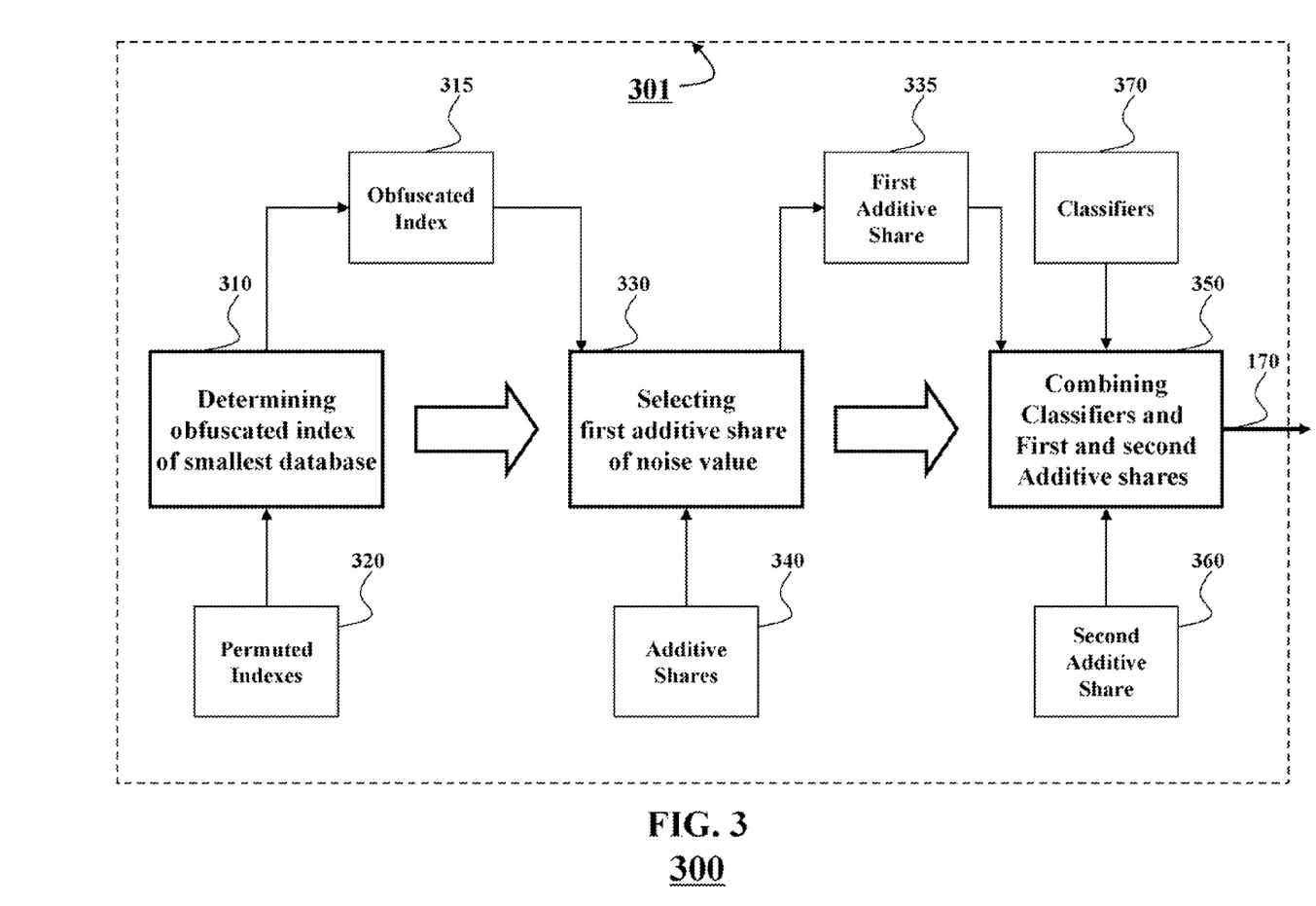
FIG. 3 is a block diagram of a method for determining the differentially private aggregate classifier securely according one embodiment of the invention.

FIG. 3 shows a block diagram of a method 300 for determining the differentially private aggregate classifier 170 using the SMC method. The method can be performed in a processor 301.

Determining an Obfuscated Index of the Smallest Database

The processor determines 310 an obfuscated index 315 of a smallest database based on permuted indexes 320 resulting from a permutation of indexes of the databases. For example, each database owner, i.e., a party $P_j$, computes $n_j=a_j+b_j$, where $a_j$ and $b_j$ are integers representing additive shares of the database lengths $n_j$ for j=1, 2, . . . , K. The K-length vectors of additive shares are defined as a and b, respectively.

The parties $P_j$ mutually agree on a permutation $\pi_1$ on the index vector (1, 2, . . . , K). This permutation is unknown to the processor. Then, each party $P_j$ transmits its share $a_j$ to a representative party $P_{\pi_1(j)}$, and transmits its share $b_j$ to the processor with the index changed according to the permutation. Thus, after this step, the parties have permuted additive shares given by $\pi_1(a)$ while the processor has permuted additive shares $\pi_1(b)$.

The parties $P_j$ generate a key pair (pk, sk) where pk is a public key for homomorphic encryption and sk is the secret decryption key known only to the parties, but not to the processor. The element-wise encryption of a is defined as $\xi(a)$. The parties send $\xi(\pi_1(a))=\pi_1(\xi(a))$ to the processor.

The processor generates a random vector $r=(r_1, r_2, \ldots, r_K)$ where the elements $r_i$ are integers selected uniformly at random and are equally likely to be positive or negative. Then, the processor computes $\xi(\pi_1(a_j))\xi(r_j)=\xi(\pi_1(a_j)+r_j)$. In vector notation, the processor computes $\xi(\pi_1(a)+r)$.

Similarly, by subtracting the same random integers in the same order to the received additive shares, the processor obtains $\pi_1(b)-r$, selects a permutation $\pi_2$ at random and obtains a signal $$\pi_2(\xi(\pi_1(a)+r))=\xi(\pi_2(\pi_1(a)+r)),$$

and a signal $\pi_2(\pi_1(b)-r)$. The processor transmits the signal $\xi(\pi_2(\pi_1(a)+r))$ to the individual parties in the order, e.g., a first element to first party $P_1$, a second element to a second party $P_2$, . . . , and $K^{th}$ element to a party $P_K$.

Each party decrypts the signal received from the processor, i.e., the parties $P_1, P_2, \ldots, P_K$ respectively possess the elements of the vector $\pi_2(\pi_1(a)+r)$ while the processor possesses the vector $\pi_2(\pi_1(b)-r)$. Because $\pi_1$ is unknown to the processor and $\pi_2$ is unknown to the parties, the indices in both vectors are obfuscated.

If $\pi_2(\pi_1(a)+r)=\tilde{a}$ and $\pi_2(\pi_1(b)-r)=\tilde{b}$, then $n_i>n_j \Rightarrow \tilde{a}_i+\tilde{b}_i>\tilde{a}_j+\tilde{b}_j \Rightarrow \tilde{a}_i-\tilde{a}_j>\tilde{b}_j-\tilde{b}_i$.

For each (i,j) pair with i,j $\in\{1,2,\ldots,K\}$, these comparisons can be solved by any implementation of a secure millionaire protocol. When all the comparisons are done, the processor determines the index $\tilde{j}$ 325 such that $\tilde{a}_j+\tilde{b}_j=\min_j n_j$. However, the true index corresponding to the smallest dataset is obfuscated.

Selecting Obliviously First Additive Share of Noise Value of Smallest Database

Based on the obfuscated index 315, the processor selects 330 obliviously from additive shares 340 of all noise values a first additive share 335 of a noise value associated with the smallest database. A second additive share 360 of the noise value associated with the smallest database is stored by one or more databases.

For example, the processor constructs an indicator vector u of length K such that $u_{\tilde{j}}=1$ and all other elements are 0. Then the processor permutes the indicator vector to produce a permuted vector $\pi_2^{-1}(u)$, where $\pi_2^{-1}$ inverts $\pi_2$. Next, the processor generates a key-pair (pk', sk') for additive homomorphic function $\zeta(\bullet)$, where only the encryption key pk' is publicly available to the parties $P_j$, and transmits $\zeta(\pi_2^{-1}(u))=\pi_2^{-1}(\zeta(U))$ to the parties $P_j$.

The parties mutually obtain a permuted vector $\pi_1^{-1}(\pi_2^{-1}(\zeta(u)))=\zeta(v)$ where $\pi_1^{-1}$ inverts the permutation $\pi_1$ originally applied by the parties $P_j$ and v is the underlying vector. Now that both permutations have been removed, the index of the non-zero element in the indicator vector v corresponds to the true index of the smallest database. However, since the parties $P_j$ cannot decrypt $\zeta(\bullet)$, the parties cannot find out this index.

For j=1, . . . , K, party $P_j$ selects the noise value $\eta_j$. In one embodiment, the noise value is a d-dimensional noise vector sampled from a Laplace distribution with parameter $$\frac{2}{n_j \varepsilon \lambda}.$$

In another embodiment, the noise value selected from different distributions. In yet another embodiment, the noise value is predetermined. Then, it obtains a d-dimensional vector $\psi_j$ where for i=1, . . . , d, $\psi_j(i)=\zeta(v(j))^{\eta_j(i)}=\zeta(v(j)\eta_j(i))$.

All parties $P_j$ compute a d-dimensional noise vector $\psi$ such that, for i=1, . . . , d, $$\Psi(i) = \prod_j \Psi_j(i) = \prod_j \zeta(v(j)\eta_j(i)) = \zeta\left(\sum_j v(j)\eta_j(i)\right).$$

By construction, the above equation selects only the noise value for the smallest database, while rejecting the noise values for all other databases. This is because has an element with value 1 at the index corresponding to the smallest database and has zeroes everywhere else.

One of the parties, e.g., $P_1$, generates a d-dimensional random integer noise vector S to produce the first additive share 335 $\psi(i)\zeta(s(i))$ for all i=1, . . . , d, and transmits the first additive share to the processor. Also, the party $P_1$ stores a second additive share 360 of the noise value, e.g., by computing $w_1-Ks$ wherein $w_1$ is the classifier of the party. Additionally or alternatively, the second additive share is stored by at multiple databases.

The processor decrypts $\psi(i)\zeta(s(i))$ to obtain $\eta(i)+s(i)$ for i=1, . . . , d. Accordingly, the processor stores a first additive share of the noise value associated with the smallest database as $K(\eta+s)$, selected party $P_1$ stores the second additive share of the noise value and the classifier as $w_1-Ks$, and all other parties $P_j$, j=2, . . . , k stores the classifiers $w_j$.

Obliviously Combining Classifiers, the First and the Second Additive Shares

In various embodiments, the processor and the K database-owning parties execute a secure function evaluation protocol, such that each of the K+1 participants obtains an additive share of the differentially private aggregate classifier $Kw^s$. In some embodiments, additive shares are generated using a computationally secure protocol. In other embodiments additive shares are generated using an unconditionally secure protocol. The resulting K+1 shares form the differentially private aggregate classifier and are published, e.g., are stored in the memory 175.

EFFECT OF THE INVENTION

The embodiments of the invention determine differentially private aggregate classifier to ensure differential privacy of multiple databases. This invention is based on the realization that, to achieve multiparty differential privacy, it is sufficient to select the stochastic component based on the size of the smallest database. Some embodiments further recognize that because of this realization the selection of the noise value can be securely performed via the SMC method.

However, unlike conventional methods, the embodiments do not use SMC to construct a classifier. Therefore, our embodiments are significantly less complex than any SMC method to compute the classifier on the combined data.

It is to be understood that various other adaptations and modifications can be made within the spirit and scope of the invention. Therefore, it is the object of the appended claims to cover all such variations and modifications as come within the true spirit and scope of the invention.

APPENDIX A

Theoretical Proof for Differential Privacy in a Multiparty Setting

It is sufficient to select the stochastic component based on the size of the smallest database. Below, a theoretical proof is given that this is indeed the case.

Proof of Differential Privacy

We show that the perturbed aggregate classifier in this invention satisfies differential privacy. We use the following bound on the sensitivity of the regularized regression classifier:

Theorem 1 Given a set of n data instances lying in a ball of radius 1, the sensitivity of regularized logistic regression function is at most $$\frac{2}{n\lambda}.$$

If $w_1$ and $w_2$ are function (classifiers) trained on adjacent databases of size n with regularization parameter $\lambda$, $$\|w_1 - w_2\|_1 \le \frac{2}{n\lambda}$$

This bound has been proved by Kamalika Chaudhuri and Claire Monteleoni in Privacy-preserving logistic regression. *Neural Information Processing Systems*, pages 289-296, 2008 and is incorporated herein by reference. To show that the perturbed function or classifier in our invention satisfies differential privacy, proceed as follows:

Theorem 2 The classifier $w^s$ preserves $\epsilon$-differential privacy. For any two adjacent databases D and D', $$\left|\log \frac{P(w^s \mid D)}{P(w^s \mid D')}\right| \le \varepsilon.$$

Proof. Consider the case where one instance of the training database D is changed to result in an adjacent database D'. This would imply a change in one element in the training database of one party and thereby a change in the corresponding learned vector $w_j^s$. Assuming that the change is in the database of the party $P_j$, the change in the learned vector is only going to be in $w_j$; let denote the new classifier by $w_{j'}$. In Theorem 1, we bound the sensitivity of $w_j$ as $$\|w_j - w_{j'}\|_1 \le \frac{2}{n_j \varepsilon \lambda}.$$

Considering that we learn the same vector $w^s$ using either the training databases D and D', we have $$\frac{P^=(\hat{w}^s \mid D)}{P(\hat{w}^s \mid D')} = \frac{P(\hat{w}_j + \eta \mid D)}{P(\hat{w}'_j + \eta \mid D')} = \frac{\exp\left[\frac{n_{(1)}\varepsilon\lambda}{2}\|\hat{w}_j\|_1\right]}{\exp\left[\frac{n_{(1)}\varepsilon\lambda}{2}\|\hat{w}'_j\|_1\right]} \le$$

$$\exp\left[\frac{n_{(1)}\varepsilon\lambda}{2}\|\hat{w}_j - \hat{w}'_j\|_1\right] \le \exp\left[\frac{n_{(1)}\varepsilon\lambda}{2}\frac{2}{n_j\lambda}\right] \le \exp\left[\frac{n_{(1)}}{n_j}\epsilon\right] \le \exp(\epsilon),$$

by the definition of function sensitivity. Similarly, we can lower bound the ratio by $\exp(-\epsilon)$ Analysis of Excess Error As expected, adding a perturbation noise term introduces an error in the function evaluation. For functions used as classifiers, this error is called as excess error or excess risk. It is the price paid for differential privacy. For a differentially private classifier to be useful, it is desired that the excess risk is small. In other words, it is desirable that adding noise does not deteriorate the classification performance by too much.

In the following discussion, we consider how much excess error is introduced when using the perturbed aggregate classifier $w^s$ in this invention (satisfying differential privacy) as opposed to the non-private unperturbed classifier $w^*$ trained on the entire training data. We also consider how much excess error is introduced with respect to the (non-private) unperturbed aggregate classifier w.

We first establish a bound on the $l_2$ norm of the difference between the aggregate classifier w and the classifier $w^*$ trained over the entire training data. To prove the bound we apply the following Lemma Lemma 1 Let G(w) and g(w) be two differentiable, convex functions of w. If $w_1 = \arg\min_w G(w)$ and $w_2 = \arg\min_w G(w) + g(w)$, then $$\|w_1 - w_2\| \le \frac{g_1}{G_2}$$

where $g_1 = \max_w \|\nabla g(w)\|$ and $G_2 = \min_v \min_w v^T \nabla^2 G(w) v$ for any unit vector $v \in \mathbb{R}^d$.

Lemma 1 is obtained from Kamalika Chaudhuri and Claire Monteiconi in Privacy-preserving logistic regression. *Neural Information Processing Systems*, pages 289-296, 2008 and is incorporated herein by reference. First, consider the following theorem bounding the excess risk between the non-private unperturbed aggregate classifier w and the non-private classifier w* tuned on the entire database.

Theorem 3 Given the aggregate classifier w, the classifier w* trained over the entire training data and $n_{(1)}$ is the size of the smallest training database, $$\|w - w^*\|_2 \leq \frac{K-1}{n_{(1)}\lambda}$$

Proof:

We formulate the problem of estimating the individual classifiers $w_j$ and the classifier w* trained over the entire training data in terms of minimizing the two differentiable and convex functions g(w) and G(w).

$$\hat{w}_j = \operatorname*{argmin}_w J(w, x|_j, y|_j) = \operatorname*{argmin}_w G(w), \quad (5)$$

$$w^* = \operatorname*{argmin}_w J(w, x, y)$$

$$= \operatorname*{argmin}_w L(w, x|_j, y|_j) + \sum_{l \in [K]-j} L(w, x|_l, y|_l) + \lambda\|w\|^2$$

$$= \operatorname*{argmin}_w J(w, x|_j, y|_j) + \sum_{l \in [K]-j} L(w, x|_l, y|_l)$$

$$= \operatorname*{argmin}_w G(w) + g(w).$$

$$\nabla g(w) = \sum_{l \in [K]-j} \frac{1}{n_l} \sum_{i=1}^{n_l} \frac{-e^{-y_i|_l w^T x_i|_l}}{1 + e^{-y_i|_l w^T x_i|_l}} y_i x_i^T,$$

$$\|\nabla g(w)\| = \left\|\sum_l \frac{1}{n_l} \sum_i \frac{-e^{-y_i|_l w^T x_i|_l}}{1 + e^{-y_i|_l w^T x_i|_l}} y_i x_i^T\right\| \leq$$

$$\sum_l \frac{1}{n_l} \left\|\sum_i \frac{-e^{-y_i|_l w^T x_i|_l}}{1 + e^{-y_i|_l w^T x_i|_l}} y_i x_i^T\right\| \leq \sum_l \frac{1}{n_l},$$

$$g_1 = \max_w \|\nabla g(w)\| \leq \sum_l \frac{1}{n_l}.$$

$$\nabla^2 G(w) = \frac{1}{n_j} \sum_i \frac{e^{y_i|_j w^T x_i|_j}}{1 + e^{y_i|_j w^T x_i|_j}} x_i|_j x_i|_j^T + \lambda 1, \; G_2 \geq \lambda. \quad (6)$$

Substituting the bounds on $g_1$ and $G_2$ in Lemma 6.2, $$\|\hat{w}_j - w^*\| \leq \frac{1}{\lambda} \sum_l \frac{1}{n_l}. \quad (7)$$

Applying triangle inequality, $$\|\hat{w} - w^*\| = \left\|\frac{1}{K}\sum_j \hat{w}_j - w^*\right\| = \frac{1}{K}\left\|\sum_j \hat{w}_j - Kw^*\right\| =$$

$$\frac{1}{K}\|(\hat{w}_1 - w^*) + \ldots + (\hat{w}_K - w^*)\| \leq \frac{1}{K}\sum_j \|\hat{w}_j - w^*\| =$$

$$\frac{1}{K\lambda}\sum_j \sum_{l \in [K]-j} \frac{1}{n_l} = \frac{K-1}{K\lambda}\sum_j \frac{1}{n_j} \leq \frac{K-1}{n_{(1)}\lambda}.$$

where $n_{(1)} = \min_j n_j$.

The bound is inversely proportional to the number of instances in the smallest database. This indicates that when the databases are of disparate sizes, w will be a lot different from w*. The largest possible value for $n_{(1)}$ is $$\frac{n}{K}$$

in which case all parties having an equal amount of training data and w will be closest to w*. In the one party case for K=1, the bound indicates that norm of the difference would be upper bounded by zero, which is a valid sanity check as the aggregate classifier w is the same as $w_*$.

We use this result to establish a bound on the empirical risk of the perturbed aggregate classifier $w^s = w + \eta$ over the empirical risk of the unperturbed classifier w* in the following theorem.

Theorem 4 If all data instances $x_i$ lie in a unit ball, with probability at least 1-δ, the empirical regularized excess risk of the perturbed aggregate classifier $w^s$ over the classifier w* trained over entire training data is $$J(w^s) \leq$$
$$J(w^*) + \frac{(K-1)^2(\lambda+1)}{2n_{(1)}^2\lambda^2} + \frac{2d^2(\lambda+1)}{n_{(1)}^2\varepsilon^2\lambda^2}\log^2\left(\frac{d}{\delta}\right) + \frac{2d(K-1)(\lambda+1)}{n_{(1)}^2\varepsilon\lambda^2}\log\left(\frac{d}{\delta}\right).$$

Proof:

We use the Taylor series expansion of the function J to have $$J(\hat{w}^s) = J(w^*) + (\hat{w}^s - w^*)^T \nabla J(w^*) + \frac{1}{2}(\hat{w}^s - w^*)^T \nabla^2 J(w)(\hat{w}^s - w^*)$$

for some $w \in R_d$. By definition, $\nabla J(w^*) = 0$.

Taking $l_2$ norm on both sides and applying Cauchy-Schwarz inequality, $$|J(\hat{w}^s) - J(w^*)| \leq \frac{1}{2}\|\hat{w}^s - w^*\|^2 \|\nabla^2 J(w)\|. \quad (8)$$

The second gradient of the regularized loss function for logistic regression is $$\nabla^2 J(w) = \frac{1}{n}\sum_i \frac{e^{y_i w^T x_i}}{1 + e^{y_i w^T x_i}} x_i x_i^T + \lambda 1 = \frac{1}{n}\sum_i \frac{1}{1 + e^{-y_i w^T x_i}} x_i x_i^T + \lambda 1.$$

Since the logistic function term is always less than one and all $x_i$ lie in a unit ball, $\|\nabla_2 J(w)\| \leq \lambda + 1$. Substituting this into Equation 8 and using the fact that $J(w^*) \leq J(w), \forall w \in R^d$, $$J(\hat{w}^s) \leq J(w^*) + \frac{\lambda+1}{2}\|\hat{w}^s - w^*\|^2. \quad (9)$$

The classifier $w^s$ is the perturbed aggregate classifier, i.e., $w^s = w + \eta$, with the noise term $$\eta : \operatorname{Lap}\left(\frac{2}{n_{(1)}\varepsilon\lambda}\right).$$

To bound $\|\eta\|$ with probability at least 1-δ, we apply the following Lemma from Kamalika Chaudhuri and Claire Monteleoni in Privacy-preserving logistic regression. *Neural Information Processing Systems*, pages 289-296, 2008 and is incorporated herein by reference.

Lemma 2 Given a d-dimensional random variable $\eta$: Lap($\beta$) i.e., $$P(\eta) = \frac{1}{2\beta} e^{-\frac{\|\eta\|_1}{\beta}}$$

with probability at least $1-\delta$, the $l_2$ norm of the random variable is bounded as $$\|\eta\| \le 2d\beta \log\left(\frac{d}{\delta}\right)$$

Substituting this into Equation 9, we have $$J(\hat{w}^s) \le J(w^*) + \frac{1}{2}\|\hat{w} - w^* + \eta\|^2 =$$

$$J(w^*) + \frac{\lambda+1}{2}[\|\hat{w} - w^*\|^2 + \|\eta\|^2 + 2(\hat{w} - w^*)^T \eta] \le$$

$$J(w^*) + \frac{\lambda+1}{2}\left[\frac{(K-1)^2}{n_{(1)}^2 \lambda^2} + \frac{4d^2}{n_{(1)}^2 \epsilon^2 \lambda^2} \log^2\left(\frac{d}{\delta}\right)\right] + (\lambda+1)(\hat{w}-w^*)^T \eta.$$

Using the Cauchy-Schwarz inequality on the last term, $$J(\hat{w}^s) \le J(w^*) + \frac{\lambda+1}{2}\left[\frac{(K-1)^2}{n_{(1)}^2 \lambda^2} + \frac{4d^2}{n_{(1)}^2 \epsilon^2 \lambda^2} \log^2\left(\frac{d}{\delta}\right)\right] +$$

$$(\lambda+1)\|\hat{w} - w^*\|\|\eta\| \le J(w^*) + \frac{(K-1)^2(\lambda+1)}{2n_{(1)}^2 \lambda^2} +$$

$$\frac{2d^2(\lambda+1)}{n_{(1)}^2 \epsilon^2 \lambda^2}\log^2\left(\frac{d}{\delta}\right) + \frac{2d(K-1)(\lambda+1)}{n_{(1)}^2 \epsilon \lambda^2}\log\left(\frac{d}{\delta}\right).$$

The bound suggests an error because of two factors: aggregation and perturbation. The bound increases for smaller values of $\epsilon$ implying a tighter definition of differential privacy, indicating a clear trade-off between privacy and utility. The bound is also inversely proportional to $n_{(1)}^2$ implying an increase in excess risk when the parties have training databases of disparate sizes.

In the limiting case $\epsilon \to \infty$, we are adding a perturbation term $\eta$ sampled from a Laplacian distribution of infinitesimally small variance resulting in the perturbed classifier being almost as same as using the unperturbed aggregate classifier w satisfying a very loose definition of differential privacy. With such a value of $\epsilon$, our bound becomes $$J(w) \le J(w^*) + \frac{(K-1)^2(\lambda+1)}{2n_{(1)}^2 \lambda^2}. \quad (3)$$

Similar to the analysis of Theorem 3, the excess error in using an aggregate classifier is inversely proportional to the size of the smallest database $n_{(1)}$ and in the one party case K=1, the bound becomes zero as the aggregate classifier w is the same as $w^*$.

While the previous theorem gives us a bound on the empirical excess risk over a given training database, it is important to consider a bound on the true excess risk of $w^s$ over $w^*$. Let us denote the true risk of the classifier $w^s$ by $\tilde{J}(w^s) = E[J(w^s)]$ and similarly, the true risk of the classifier $w^*$ by $\tilde{J}(w^*) = E[J(w^*)]$.

Theorem 5 If all training data instances $x_i$ lie in a unit ball, with probability at least $1-\delta$, the true excess risk of the perturbed aggregate classifier $w^s$ over the classifier $w^*$ trained over entire training data is $$\tilde{J}(w^s) \le \tilde{J}(w^*) + \frac{2(K-1)^2(\lambda+1)}{2n_{(1)}^2 \lambda^2} + \frac{4d^2(\lambda+1)}{n_{(1)}^2 \epsilon^2 \lambda^2}\log^2\left(\frac{d}{\delta}\right) +$$

$$\frac{4d(K-1)(\lambda+1)}{n_{(1)}^2 \epsilon \lambda^2}\log\left(\frac{d}{\delta}\right) + \frac{16}{\lambda n}\left[32 + \log\left(\frac{1}{\delta}\right)\right].$$

Proof:
Let $w^r$ be the classifier minimizing $\tilde{J}(w)$. By rearranging the terms, $$\tilde{J}(w^s) = \tilde{J}(w^*) + [\tilde{J}(w^s) - \tilde{J}(w^r)] + [\tilde{J}(w^r) - \tilde{J}(w^*)] \le$$
$$\tilde{J}(w^*) + [\tilde{J}(w^s) - \tilde{J}(w^r)].$$

To proceed, we first need a bound between the true excess risk of any classifier as an expression of bound on the regularized empirical risk for that classifier and the classifier minimizing the regularized empirical risk. With probability at least $1-\delta$, $$\tilde{J}(w^s) - \tilde{J}(w^r) \le 2[J(w^s) - J(w^*)] + \frac{16}{\lambda n}\left[32 + \log\left(\frac{1}{\delta}\right)\right]. \quad (10)$$

Substituting the bound from Theorem 4, $$\tilde{J}(w^s) - \tilde{J}(w^r) \le \frac{2(K-1)^2(\lambda+1)}{2n_{(1)}^2 \lambda^2} + \frac{4d^2(\lambda+1)}{n_{(1)}^2 \epsilon^2 \lambda^2}\log^2\left(\frac{d}{\delta}\right) \quad (11)$$

$$+ \frac{4d(K-1)(\lambda+1)}{n_{(1)}^2 \epsilon \lambda^2}\log\left(\frac{d}{\delta}\right) + \frac{16}{\lambda n}\left[32 + \log\left(\frac{1}{\delta}\right)\right]. \quad (12)$$

Substituting this bound into Equation 10 gives us a bound on the true excess risk of the classifier $w^s$ over the classifier $w^*$.

We claim:
1. A method for determining a differentially private aggregate classifier for a set of databases, wherein each database in the set of databases is associated with a classifier and a noise value, wherein the classifier and the noise value are determined locally for each database, such that a combination of the classifier and the noise value ensure a differential data privacy of the database, and wherein the differentially private aggregate classifier preserves the differential data privacy of each database, comprising the steps of:
    combining classifiers to determine an aggregate classifier;
    modifying the aggregate classifier with a noise value corresponding to a smallest database in the set of databases to produce the differentially private aggregate classifier;
    determining an obfuscated index of the smallest database resulting from a permutation of indexes of the set of databases;
    selecting obliviously, from additive shares of all noise values, a first additive share of the noise value associated with the smallest database based on the obfuscated index, wherein a second additive share of the noise value is stored in one or more databases; and
    determining the differentially private aggregate classifier by obliviously combining each classifier, the first and the second additive shares of the noise value, wherein the steps of the method are performed by a processor.

2. The method of claim 1, wherein the smallest database has a smallest number of entries, wherein data structures of the entries are identical for all databases.

3. The method of claim 1, wherein the noise value is distributed according to a Laplace distribution.

4. The method of claim 1, Wherein the noise value for each database is determined based on a size of the database.

5. The method of claim 1 wherein the classifier is a binary logistic regression classifier.

6. The method of claim 5, wherein the classifier is a multiclass classifier constructed from a combination of binary logistic regression classifiers.

7. The method of claim 1, wherein the determining of the differentially private classifier is performed by a. cryptographic protocol.

8. The method of claim 1., wherein the determining of the differentially private classifier is performed by a secret sharing protocol.

9. A system for determining a differentially private aggregate classifier for a set of databases, wherein each database in the set of databases is associated with a classifier and a noise value, wherein the classifier and the noise value are determined locally for each database, such that a combination of the classifier and the noise value ensure a differential data privacy of the database, and wherein the differentially private aggregate classifier preserves the differential data privacy of each database, comprising:

a processor for combining classifiers to determine an aggregate classifier and for modifying the aggregate classifier with a noise value corresponding to a smallest database in the set of databases to produce the differentially private aggregate classifier, wherein the processor is further configured for determining an obfuscated index of the smallest database resulting from a permutation of indexes of the set of databases; for selecting obliviously, from additive Shares of all noise values, a first additive share of the noise value associated with the smallest database based on the obfuscated index, wherein a second additive share of the noise value is stored in one or more databases; and for determining, the differentially private aggregate classifier by obliviously combining each classifier, the first and the second additive shares of the noise value.

10. The system of claim 9, wherein the smallest database has a smallest number of entries, wherein data structures of the entries are identical for all databases.

11. The system of claim 9, wherein the noise value is distributed according to a Laplace distribution.

12. The system of claim 9, wherein the noise value for each database is determined based on a size of the database.

* * * * *